(12) United States Patent
Rompel

(10) Patent No.: US 7,556,459 B2
(45) Date of Patent: Jul. 7, 2009

(54) HOLE SAW HAVING A DRILL BIT WITH A PILOT TIP

(75) Inventor: Markus Rompel, Runkel/Schadeck (DE)

(73) Assignee: Black & Decker Inc., Newark, DE (US)

( * ) Notice: Subject to any disclaimer, the term of this patent is extended or adjusted under 35 U.S.C. 154(b) by 508 days.

(21) Appl. No.: 11/268,700

(22) Filed: Nov. 7, 2005

(65) Prior Publication Data

US 2007/0104548 A1 May 10, 2007

(51) Int. Cl.
*B23B 51/05* (2006.01)
(52) U.S. Cl. .................. 408/204; 408/206; 408/225
(58) Field of Classification Search ......... 408/204–208, 408/223–225, 227, 230; B23B 51/04, 51/05
See application file for complete search history.

(56) References Cited

U.S. PATENT DOCUMENTS

| | | | |
|---|---|---|---|
| 3,559,513 A | | 2/1971 | Hougen |
| 3,609,056 A | | 9/1971 | Hougen |
| 3,648,508 A | | 3/1972 | Hougen |
| 3,825,362 A | | 7/1974 | Hougen |
| 4,090,804 A | * | 5/1978 | Haley ............................ 408/59 |
| 4,131,384 A | * | 12/1978 | Hougen ......................... 408/68 |
| 4,605,347 A | * | 8/1986 | Jodock et al. ................ 408/224 |
| 5,442,979 A | * | 8/1995 | Hsu ............................ 76/108.6 |
| 5,934,845 A | | 8/1999 | Frey |
| 6,007,279 A | | 12/1999 | Malone, Jr. |
| 6,045,302 A | | 4/2000 | Orr |
| 6,652,203 B1 | * | 11/2003 | Risen, Jr. ..................... 408/225 |
| 6,705,807 B1 | | 3/2004 | Rudolph et al. |
| 2003/0202853 A1 | * | 10/2003 | Ko et al. ..................... 408/225 |
| 2004/0191015 A1 | | 9/2004 | Kozak |
| 2005/0053438 A1 | | 3/2005 | Wetzl et al. |
| 2005/0105981 A1 | * | 5/2005 | Byrley et al. ................ 408/204 |
| 2007/0212179 A1 | * | 9/2007 | Khangar et al. ............. 408/204 |

FOREIGN PATENT DOCUMENTS

| | | |
|---|---|---|
| DE | 202 03 232 | 6/2002 |
| DE | 10130681 | 1/2003 |
| EP | 0 455 420 A2 | 11/1991 |
| EP | 0 522 202 B1 | 3/1995 |
| EP | 1 238 732 | 9/2002 |
| EP | 1 016 480 B1 | 9/2004 |
| JP | 58010416 A * | 1/1983 |
| JP | 04322907 A * | 11/1992 |
| JP | 09-225720 | 9/1997 |
| JP | 2003-225819 | 8/2003 |
| WO | WO 2004/011179 | 2/2004 |

* cited by examiner

*Primary Examiner*—Daniel W Howell
(74) *Attorney, Agent, or Firm*—Harness, Dickey & Pierce, P.L.C.

(57) ABSTRACT

A hole saw has an arbor and a cup shaped cutting member. The cup shaped cutting member has an annular skirt with a plurality of teeth at its free end. A drill bit is secured on the arbor. The drill bit includes a pilot point with a first cutting edge. A second edge is formed on the body portion of the drill bit to form a constant diameter hole in the workpiece.

15 Claims, 3 Drawing Sheets

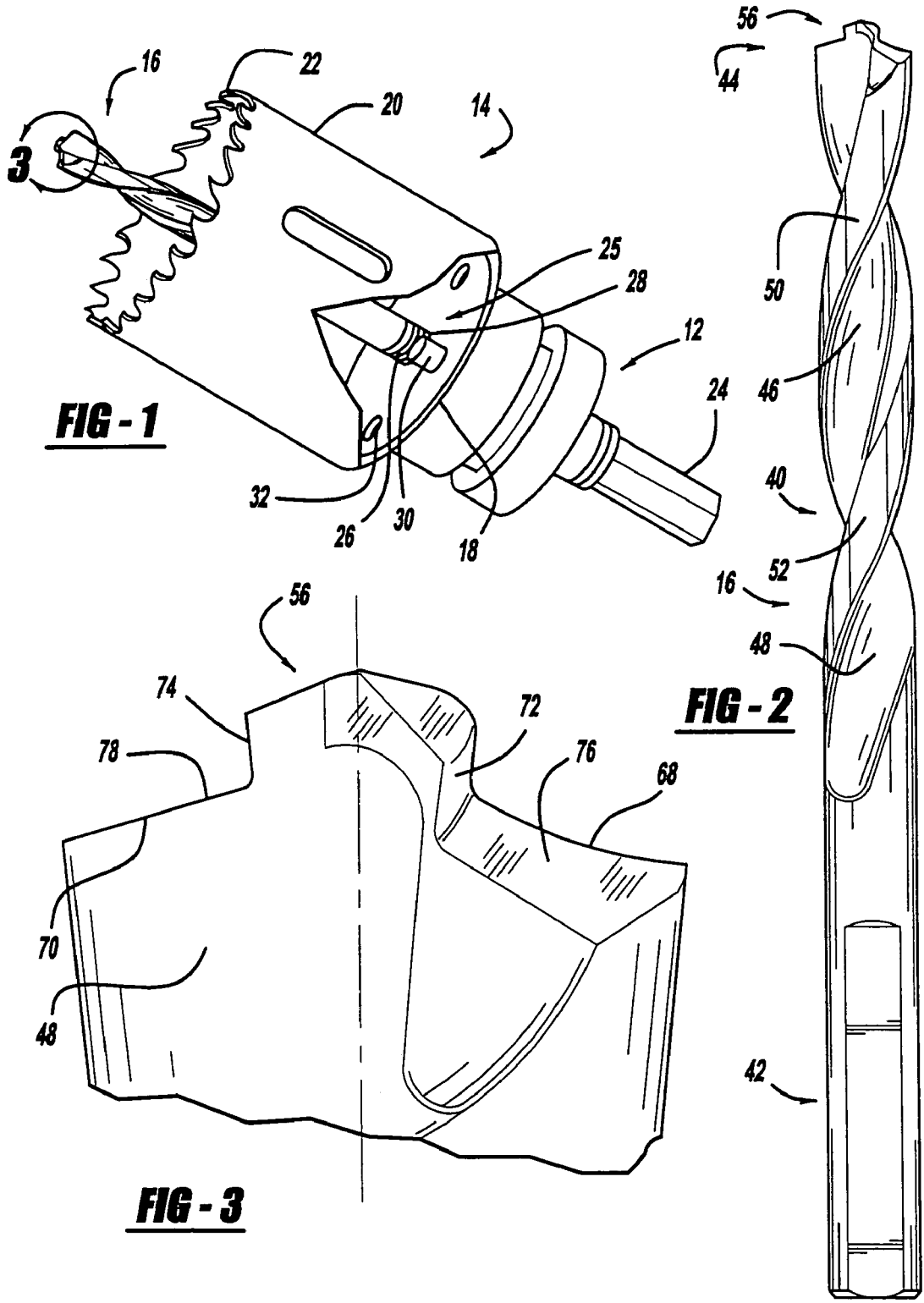

HOLE SAW HAVING A DRILL BIT WITH A PILOT TIP

FIELD OF THE INVENTION

The present invention relates to hole cutting and, more particularly, to a hole saw with a twist drill bit including a pilot tip.

BACKGROUND OF THE INVENTION

Hole saws are used in the construction industry for drilling holes which include a diameter of larger than 9/16 inch. Most commonly, hole saws are utilized to provide holes in electric panels, wood or metal studs. The holes must be drilled accurately and quickly. This enables the workpiece to be smooth around the area of the drilled hole.

When drilling the holes, it is important to initiate a pilot hole to center the annular skirt of the hole saw into a cutting position. Various types of pilot bits exist in the art. A common problem which exists with these drill bits is they skip or walk on the workpiece. More specifically, as the drill bit is inserted into the workpiece, it has a tendency to move along the workpiece and not enter the workpiece at the desired point. It has been found that during hole drilling with a hole saw, specifically in metal, that two-thirds of the time is spent drilling a pilot hole while only one-third of the time is used to drill the actual hole. Thus, it is desirable to eliminate skipping or walking during the hole drilling operation. Also, it is desirable to reduce the time required to drill a hole into the workpiece.

SUMMARY OF THE INVENTION

The present invention provides the art with a hole saw which reduces the time required to drill a hole into the workpiece. Also, the present invention provides a hole saw which reduces the walking or skipping phenomenon during drilling of the workpiece. The present invention enables the user to drill a more accurate hole, faster.

According to the present invention, a hole saw comprises an arbor and a cup shaped member coupled with the arbor. The cup shaped member has a skirt with teeth at its free end. The drill bit is coupled with the arbor and cup shaped member to form a starter hole in the workpiece. The drill bit includes a first cutting tip defining a first diameter. A second cutting edge defines a second diameter. The second diameter is larger than the first diameter. The second diameter is a twist drill body having a substantially constant diameter.

According to the invention, a hole saw comprises an arbor and a cup shaped member coupled with the arbor. The cup shaped member has a skirt with teeth at its free end. A drill bit is coupled with the arbor or cup shaped member. The drill bit is a twist drill having a cutting pilot tip.

According to the invention, a hole saw comprises an arbor and a cup shaped member coupled with the arbor. The cup shaped member has a skit with teeth at its free end. A drill bit, which includes a flute portion, is coupled with the arbor. The drill bit has a first cutting edge defining a first diameter and a second cutting edge defining a second diameter. The second diameter is greater than the first diameter. The second cutting edge is positioned at the terminus of the flute portion of the drill bit body.

According to the invention, a hole saw comprises an arbor and a cup shaped member coupled with the arbor. The cup shaped member has a skirt with teeth at its free end. A twist drill is coupled with the arbor. The twist drill has at least one flute on a body portion of the drill bit. The body portion has a substantially constant diameter. A first cutting edge is at the terminus of the body portion adjacent the flute. A second cutting edge is spaced inwardly and forwardly of the first cutting edge. The second edge is smaller than the first cutting edge.

According to the invention, a hole saw comprises an arbor and a cup shaped member coupled with the arbor. The cup shaped member has a skirt with teeth at its free end. A drill bit, which includes a helical flute, is coupled with the arbor. The drill bit has two cutting edges, each defining a diameter when rotated into a workpiece. One diameter is larger than the other. One cutting edge is spaced forward of the other cutting edge for first contacting the workpiece. The flute adjacent the two cutting edges forms a rake face of both cutting edges.

According to the invention, a hole saw comprises an arbor and cup shaped member coupled with the arbor. The cup shaped member has a skirt with teeth at its free end. A drill bit is coupled with the arbor. The drill bit has a pair of helical flutes along a body portion. A tip is at one end of the body and a shank is at the other. The tip includes a pilot which extends from a terminus of the body portion. The pilot includes a first pair of cutting edges on the pilot. A second pair of cutting edges is at the terminus of the body portion spaced from the first pair of cutting edges. The pair of helical flutes receives swarf from the first and second pair of cutting edges.

According to the invention, a hole saw comprises an arbor and a cup shaped member coupled with the arbor. The cup shaped member has a skirt with teeth at its free end. A drill bit is coupled with the arbor. The drill bit has a helical flute on a body portion. A terminus of the body portion has a cutting tip. The cutting tip includes a projecting pilot with a first cutting edge. A second cutting edge is spaced from the first cutting edge. Both the first and second cutting edges are angled with respect to a longitudinal axis of the body portion of the drill bit. The angle is such that the tip effectively enters a workpiece at a rotation speed of about 300 to about 1200 RPMs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a hole saw in accordance with the present invention.

FIG. 2 is an elevation view of the drill bit of the hole saw in accordance with the present invention.

FIG. 3 is an enlarged perspective view of the drill bit tip of the hole saw.

DETAILED DESCRIPTION OF THE PREFERRED EMBODIMENTS

Figure 4:
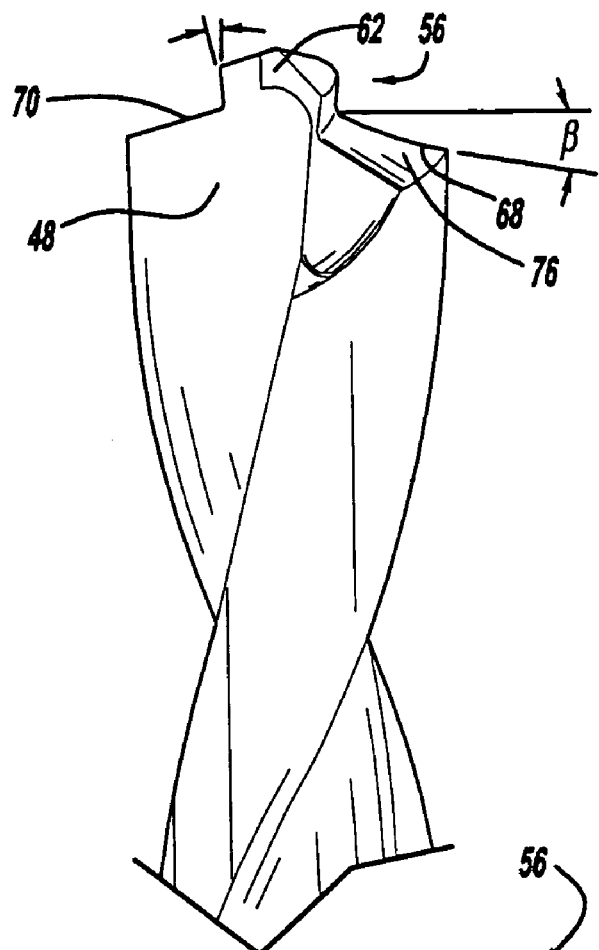
FIG. 4 is another perspective view like FIG. 2 from another side.
Figure 5:
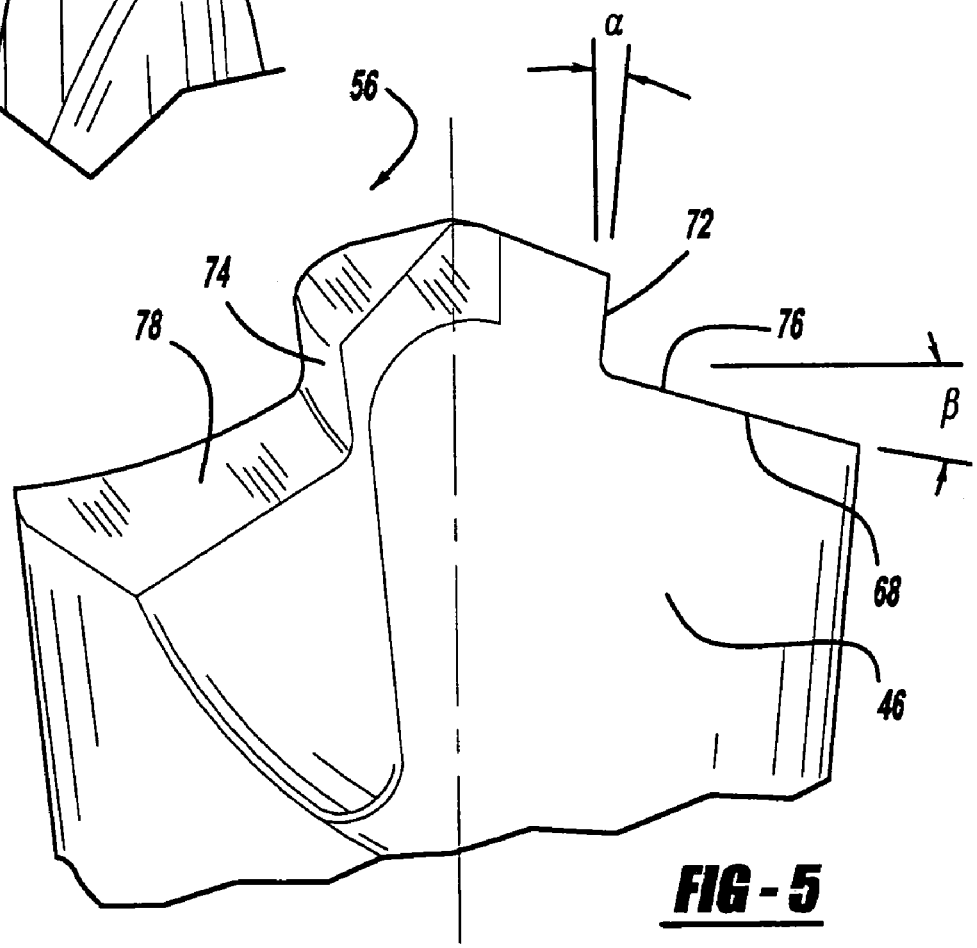
FIG. 5 is a side elevation schematic view of the tip of the drill bit.
Figure 6:
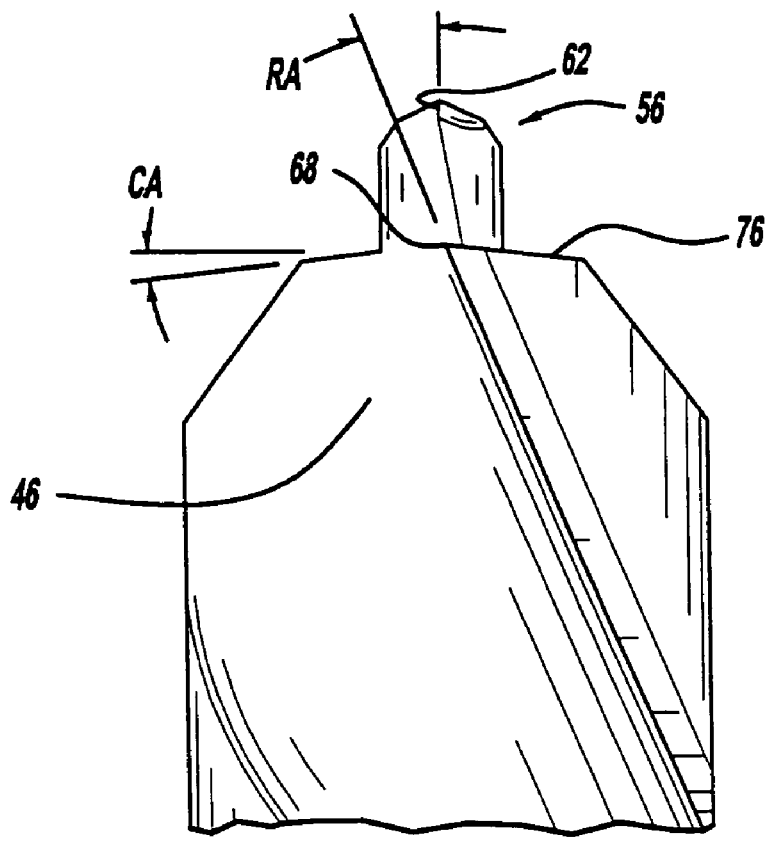
FIG. 6 is a side elevation view like that of FIG. 4 rotated 90°.
Figure 7:
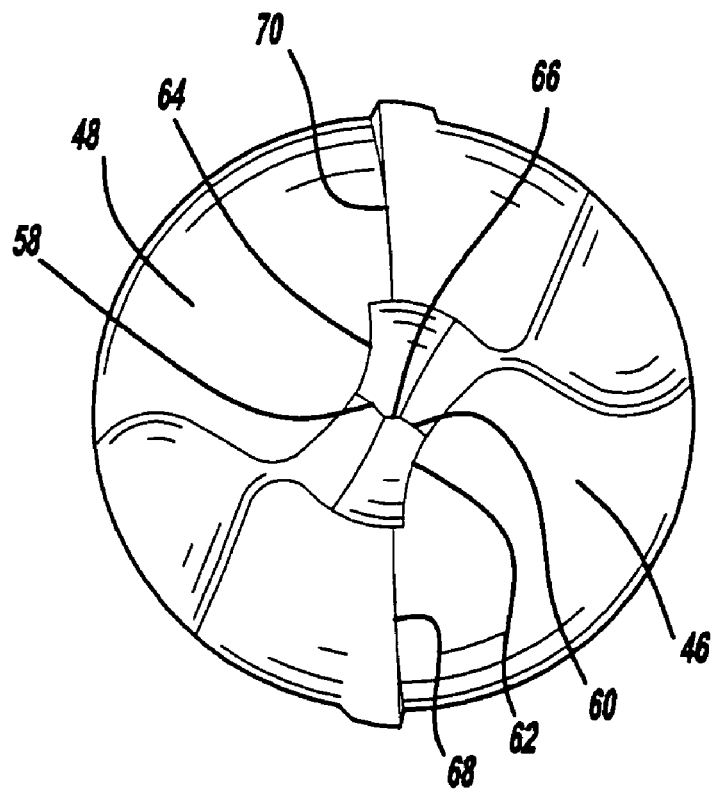
FIG. 7 is a top plan view of the tip of the drill bit.

The following description of the preferred embodiment(s) is merely exemplary in nature and is in no way intended to limit the invention, its application, or uses.

Turning to the figures, a hole saw is illustrated and designated with the reference numeral 10. The hole saw includes an arbor 12 coupled with a cup shaped cutting member 14. A drill bit 16 extends from the arbor 12 and cup shaped cutting member 14. The cup shaped cutting member 14 includes a base 18 with a unitary skirt 20. A plurality of teeth 22 are formed in the cup shaped cutting member at the end of the skirt 20.

The arbor 12 includes a shank 24 which secures into a drill or the like. The arbor 12 also includes a retaining portion 25 to retain the cup shaped cutting member 14 onto the arbor 12. The retaining portion 25 generally includes an extended threaded nipple 26 which is received into a threaded hole 28 in the base 18 of the cup shaped cutting member 14. This retains the cup shaped cutting member 14 onto the arbor 12. Also, the arbor 12 may include positioning members 30 which extend through apertures 32 in the base 18 to maintain the cup shaped cutting member 14 from rotating with respect to the arbor 12.

The cup shaped cutting member skirt 20 defines the diameter of the hole which is to be bored into the workpiece. The skirt 20 is an annular member of a desired diameter. Ordinarily, the diameter is greater than 9/16 of an inch.

The drill bit 16 includes a body portion 40, a shank 42 and a tip 44. The shank 42 is received in a bore of the arbor 14. The body portion 44 includes a pair of helical flutes 46 and 48 which terminate at the tip 44. The drill bit 16 includes a tapered web which improves the durability of the tip 44. The helical flutes 46, 48 are separated by a helical land 50, 52. The lands 50, 52 define the diameter of the twist drill body which remains constant along the body of the drill bit 16.

The tip 44 includes a pilot point 56 which extends from the terminus of the body portion 40 at a desired distance. The pilot point 56 includes a pair of inner minor cutting edges 58 and 60 and outer minor cutting edges 62 and 64. Also, a chisel point 66 may be formed between the inner cutting edges 58 and 60. In this embodiment, a split point pilot point is illustrated. A better description of the drill bit is provided in U.S. Ser. No. 11/268,701, filed on the same date as the present application, and entitled "Twist Drill With a Pilot Tip", assigned to the same assignee, the specification and drawings of which are herein expressly incorporated by reference. However, a different type of cutting pilot point could be used.

The body terminus includes major cutting edges 68 and 70. The major cutting edges 68 and 70 radiate to define the outer diameter of the body portion 40. Also, the major cutting edges 68, 70 are substantially co-planar and pass through the longitudinal axis. The cutting edges 62 and 64 radiate to define the diameter of the pilot point 56. Thus, two different diameters are defined by the two pairs of cutting edges 68, 70 and 62, 64. Also, the first cutting edges 62, 64 are spaced forwardly from the major or second cutting edges 68 and 70.

The pilot point tip has curved sides 72 and 74. The curved sides 72 and 74 are angled inward from the minor outer cutting edges 62, 64 towards the major cutting edges 68, 70 at an angle α from 0.5° to 5° to provide clearance and relief for the cutting pilot point 56. The major cutting edges 68 and 70 include clearance surfaces 76 and 78. The clearance surfaces 76 and 78 are angled with respect to horizontal at an angle (CA) of about 8° to 12°. This provides clearance for the swarf as it is cut at the edges 68 and 70. The cutting edges 68 and 70, as well as the clearance faces 76 and 78, are angled from horizontal with respect to the longitudinal axis at an angle β from 0° to about 27° and preferably about 22° to about 27°. This angle β provides for efficient cutting of the drill bit at a speed of about 300 to about 1200 RPMs. It should be noted that this speed is significantly less than the speed of the drill bit by itself without the hole saw cup shaped cutting member 14. The speed of the drill bit by itself is about 1200 RPMs. Thus, the present drill bit provides efficient cutting at a much lower rpm.

The helical flute 46 and 48 terminate at the end of the body portion and at the pilot point 56. The flute surface defines the rake face of the cutting edges 68 and 70 as well as the rake face of cutting edges 62 and 64. The rake angle (RA) and clearance angle are defined to provide optimum cutting. The rake angle is between about 6° to about 10°. The rake angle is the same for both sets of cutting edges 62, 64 and 68, 70.

The pilot point diameter (d) is a percentage of the body portion diameter (D). The percentage is based upon the desired application of the drill bit. The diameter of the minor cutting edges is always smaller than the diameter of the major cutting edges. Also, the minor cutting edges create a first hole in the workpiece which prohibits the skipping or walking phenomenon. After the pilot point 56 has entered into the workpiece, the secondary cutting edges 68, 70 create a larger hole in the workpiece to further center the hole saw during operation. The second diameter is larger than that of the first. Thus, the drill bit efficiently centers the hole saw in position. Also, since the pilot point 56 rapidly enters the workpiece, followed by the entry of the secondary cutting edges 68, 70, this enhances the speed of which the hole saw cuts. It has been found that the pilot point tip minor cutting edges 62, 64 and the secondary cutting edges 68, 70 reduce the drilling time to drill a pilot hole by about 30%. This, in turn, reduces the overall drilling time of the hole saw by approximately 20%. Accordingly, the present invention drills a faster pilot hole, which, in turn, enables the hole saw to cut faster to drill a hole which is a desired feature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hole saw comprising:
   an arbor;
   a cup shaped cutting member coupled with said arbor, said cup shaped cutting member having a skirt with teeth at its free end;
   a drill bit coupled with said arbor or cup shaped cutting member for forming a starter hole in a workpiece, said drill bit including a first cutting tip having a first cutting edge including an inner and outer cutting edge portion, said first cutting tip defining a first diameter, and a second cutting edge defining a second diameter, said second diameter being larger than said first diameter, said second cutting edge axially spaced from first cutting edge so that said first cutting edge forms a bore of said first diameter in the workpiece prior to said second cutting edge entering said workpiece, said second cutting edge being angled from horizontal with respect to a longitudinal axis from 22° to 27°, and said second diameter defining a diameter of a twist drill having a substantially constant diameter cutting said workpiece at a rotational speed between 300 to 1200 RPM.

2. The hole saw according to claim 1, wherein said drill bit has a split point pilot tip.

3. The hole saw according to claim 1, wherein the second cutting edge is a pair of cutting edges.

4. The hole saw according to claim 3, wherein the pair of cutting edges are substantially co-planar and pass through the longitudinal axis.

5. The hole saw according to claim 1, wherein rake faces of said first cutting edge tip and said second cutting edge tip are co-planar.

6. A hole saw comprising:
an arbor;
a cup shaped cutting member coupled with said arbor, said cup shaped cutting member having a skirt with teeth at its free end; and
a drill bit coupled with said arbor or cup shaped cutting member, said drill bit being a twist drill having a cutting pilot point, said pilot point including a first pair of cutting edges on said pilot point both including an inner and outer cutting edge portion, a second pair of cutting edges positioned at the terminus of said body portion spaced from said first pair of cutting edges so that said first pair of cutting edge form a bore of a first diameter in the workpiece prior to said second pair of cutting edge entering said workpiece, said second pair of cutting edge being angled from horizontal with respect to a longitudinal axis from 22° to 27°, said pair of helical flutes receiving swarf from said first and second pairs of said cutting edges and cutting said workpiece at a rotational speed between 300 to 1200 RPM.

7. A hole saw comprising:
an arbor;
a cup shaped cutting member coupled with said arbor, said cup shaped cutting member having a skirt with teeth at its free end; and
a drill bit having at least one flute coupled with said arbor, said drill bit having a first cutting edge including an inner and outer cutting edge portion, defining a first diameter and a second cutting edge defining a second diameter greater than said first diameter so that said first cutting edge forms a bore of said first diameter in the workpiece prior to said second cutting edge entering said workpiece, said second cutting edge being angled from horizontal with respect to a longitudinal axis from 22° to 27°, said second cutting edge positioned at a terminus of said flute of said drill bit cutting said workpiece at a rotational speed between 300 to 1200 RPM.

8. The hole saw according to claim 7, wherein the second cutting edge is a pair of cutting edges.

9. The hole saw according to claim 8, wherein the pair of cutting edges are substantially co-planar and pass through the longitudinal axis.

10. A hole saw comprising:
an arbor;
a cup shaped cutting member coupled with said arbor, said cup shaped cutting member having a skirt with teeth at its free end; and
a twist drill bit coupled with said arbor, said twist drill bit having at least one flute on a body portion, said body portion having a substantially constant diameter, a cutting edge at a terminus of said body portion adjacent said flute, a cutting edge spaced inwardly and forwardly of said body cutting edge, said inward cutting edge including an inner and outer cutting edge portion so that said inward cutting edge forms a bore of a first diameter in the workpiece prior to said body cutting edge entering said workpiece, said body cutting edge being angled from horizontal with respect to a longitudinal axis from 22° to 27°, said spaced cutting edge is smaller than said body cutting edge and cutting said workpiece at a rotational speed between 300 to 1200 RPM.

11. A hole saw comprising:
an arbor;
a cup shaped cutting member coupled with said arbor, said cup shaped cutting member having a skirt with teeth at its free end; and
a drill bit having a helical flute coupled with said arbor, said drill bit having two cutting edges, each defining a diameter when rotated in a workpiece, one diameter being larger than the other, one cutting edge being spaced forward of the other cutting edge for first contacting the workpiece said forward cutting edge including an inner and outer cutting edge portion so that said forward cutting edge forms a bore of a smaller diameter in the workpiece prior to said other cutting edge entering said workpiece, said other cutting edge being angled from horizontal with respect to a longitudinal axis from 22° to 27°, and said flute adjacent said two cutting edges forming a rake face for said two cutting edges and cutting said workpiece at a rotational speed between 300 to 1200 RPM.

12. The hole saw according to claim 11, wherein rake faces of said first cutting tip and said second cutting tip have the same angle.

13. A hole saw comprising:
an arbor;
a cup shaped cutting member coupled with said arbor, said cup shaped cutting member having a skirt with teeth at Its tree end; and
a drill bit having a pair of helical flute along a body portion, a tip at one end of the body portion and a shank at another end of the body portion, said tip including a pilot point extending from a terminus of said body portion, said pilot point including a first pair of cutting edges on said pilot point both including an inner and outer cutting edge portion, a second pair of cutting edges positioned at the terminus of said body portion spaced from said first pair of cutting edges so that said first pair of cutting edge form a bore of a first diameter in the workpiece prior to said second pair of cutting edge entering said workpiece, said second pair of cutting edge being angled from horizontal with respect to a longitudinal axis from 22° to 27°, said pair of helical flutes receiving swarf from said first and second pairs of said cutting edges and cutting said workpiece at a rotational speed between 300 to 1200 RPM.

14. The hole saw according to claim 13, wherein said second pair of cutting edges are substantlaily co-planar and pass through the longitudinal axis.

15. A hole saw comprising:
an arbor;
a cup shaped cutting member coupled with said arbor, said cup shaped cutting member having a skirt with teeth at its free end; and
a drill bit having a helical flute on a body portion, a terminus of said body portion having a cutting tip, said cutting tip including a projecting pilot point and a cutting end edge at said terminus of said body, said projecting pilot point including a first cutting edge and a second cutting edge spaced from said first cutting edge, both said first and second cutting edges angled from horizontal with respect to a longitudinal axis of said body portion such that the tip efficiently enters a workpiece at a rotation speed of about 300 to 1200 RPMs and said cutting edge at said terminus of said body including a pair of cutting edges being substantially co-planar and pass through the longitudinal axis.

* * * * *

UNITED STATES PATENT AND TRADEMARK OFFICE
CERTIFICATE OF CORRECTION

PATENT NO. : 7,556,459 B2
APPLICATION NO. : 11/268700
DATED : July 7, 2009
INVENTOR(S) : Markus Rompel It is certified that error appears in the above-identified patent and that said Letters Patent is hereby corrected as shown below:

Column 6,
Line 27, "Its tree" should be --its free--.
Line 45, "substantlaily" should be --substantially--.

Signed and Sealed this

Twenty-ninth Day of September, 2009

David J. Kappos
*Director of the United States Patent and Trademark Office*